United States Patent
Jeong et al.

(10) Patent No.: US 8,689,314 B2
(45) Date of Patent: Apr. 1, 2014

(54) METHOD AND APPARATUS OF MANAGING ENTITLEMENT MANAGEMENT MESSAGE FOR SUPPORTING MOBILITY OF DCAS HOST

(75) Inventors: Young Ho Jeong, Daejeon (KR); O Hyung Kwon, Daejeon (KR); Soo In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1157 days.

(21) Appl. No.: 12/144,749

(22) Filed: Jun. 24, 2008

(65) Prior Publication Data

US 2009/0138957 A1    May 28, 2009

(30) Foreign Application Priority Data

Nov. 27, 2007 (KR) .................. 10-2007-0121479

(51) Int. Cl.
*G06F 21/00* (2013.01)
*H04L 29/06* (2006.01)
*H04N 7/16* (2011.01)
*H04N 7/173* (2011.01)
*H04N 21/258* (2011.01)
*H04N 21/414* (2011.01)
*H04N 21/418* (2011.01)
*H04N 21/6334* (2011.01)

(52) U.S. Cl.
CPC ............ *H04L 63/0281* (2013.01); *H04L 63/10* (2013.01); *H04N 7/165* (2013.01); *H04N 7/17318* (2013.01); *H04N 21/25816* (2013.01); *H04N 21/41407* (2013.01); *H04N 21/4181* (2013.01); *H04N 21/63345* (2013.01); *H04L 2463/101* (2013.01)
USPC .......................................................... 726/12

(58) Field of Classification Search
CPC .... G04L 63/0281; G04L 63/10; H04N 7/165; H04N 7/17318; H04N 21/25816; H04N 21/41407; H04N 21/4181; H04N 21/63345; H04L 2463/101
USPC .......................................................... 726/12
See application file for complete search history.

(56) References Cited

U.S. PATENT DOCUMENTS 6,246,767 B1   6/2001 Akins, III et al.
7,039,802 B1 * 5/2006 Eskicioglu et al. ........... 713/156

(Continued)

FOREIGN PATENT DOCUMENTS

KR    1020040050561 A    6/2004
KR    1020050066500 A    6/2005
KR    1020060065998 A    6/2006

OTHER PUBLICATIONS

Etnews.Co.Kr; "OpenCable DCAS for a New Alternative", http://www.etnews.co.kr; Copyright © 2000-2005 Electronic Times Internet Co., Ltd. 4 pages.

*Primary Examiner* — William Goodchild
(74) *Attorney, Agent, or Firm* — Ladas & Parry LLP (57) ABSTRACT

A method of supporting a mobility of a Downloadable Conditional Access System (DCAS) host is provided. The method includes: by the second authentication proxy server: performing mutual authentication with a secure micro of the host to generate a session key; requesting an integrated personalization system to download a secure micro client to the host, wherein the secure micro client is encoded using the session key; and transmitting, to a DPS, mapping information between the second authentication proxy server and the secure micro of the host, wherein, in response to receiving the mapping information, the DPS instructs a CAS server to transmit an entitlement management message to the network of the second authentication proxy server without transmitting the entitlement management message to the network of the first authentication proxy server.

13 Claims, 5 Drawing Sheets

(56) References Cited

U.S. PATENT DOCUMENTS

| | | | |
|---|---|---|---|
| 2002/0051539 A1* | 5/2002 | Okimoto et al. | 380/211 |
| 2003/0005435 A1* | 1/2003 | Nelger et al. | 725/31 |
| 2003/0108199 A1* | 6/2003 | Pinder et al. | 380/200 |
| 2006/0117177 A1* | 6/2006 | Buer | 713/155 |
| 2006/0174351 A1* | 8/2006 | Park et al. | 726/27 |
| 2007/0086589 A1* | 4/2007 | Park | 380/201 |
| 2007/0121940 A1* | 5/2007 | Park et al. | 380/201 |

* cited by examiner

METHOD AND APPARATUS OF MANAGING ENTITLEMENT MANAGEMENT MESSAGE FOR SUPPORTING MOBILITY OF DCAS HOST

CROSS-REFERENCE TO RELATED APPLICATION

This application claims priority from Korean Patent Application No. 10-2007-0121479, filed on Nov. 27, 2007, in the Korean Intellectual Property Office, the entire disclosure of which is incorporated herein by reference.

BACKGROUND OF THE INVENTION

1. Field of the Invention

The present invention relates to technology that can support a Downloadable Conditional Access System (DCAS) host when the DCAS host moves between networks of an authentication proxy server in a DCAS network. This work was supported by the IT R&D program of MIC/IITA. [2007-S-007-01, The Development of Downloadable Conditional Access System]

2. Description of Related Art

A conditional access system in a cable network determines whether to permit a service based on a user authentication and thereby controls only an authenticated user to view a particular program when a user desires to view the program.

In the case of early conditional access systems, each manufacturer used a different standard and thus each conditional access system was compatible with only equipment produced by a particular manufacturer. Accordingly, since a broadcasting service provider should directly supply an access terminal to a subscriber, the broadcasting service provider had some burdens and had difficulty in updating the conditional access system.

In order to solve the above problems, OpenCable of North America published a standard to separate a conditional access module from a subscriber terminal. This was to prevent a particular CAS provider from monopolizing the market and encourage competition between CAS providers and thereby reduce product price. The conditional access module separated from the subscriber terminal has been standardized as a cable card in a Personal Computer Memory Card International Association (PCMCIA) card type. Accordingly, the broadcasting service provider was able to supply only the cable card to the subscriber without lending the access terminal to the subscriber and thereby provide a paid broadcasting service. However, the price of the cable card and management cost was increased and a terminal retail market was not stimulated, which resulted in debasing the result desired by Open-Cable.

In this situation, there emerged technology associated with Downloadable Conditional Access System (DCAS) that can download conditional access software to a subscriber terminal to enable a paid broadcasting service, without needing a separate hardware-based conditional access module.

A DCAS headend system accesses a corresponding network to download conditional access software to an authenticated receiver and the receiver installs the downloaded software. In this instance, a user may receive program access entitlement information that is provided from a conditional access system (CAS) server using the installed software and thereby can view a program.

When the receiver moves to a network of another authentication proxy server and then initially accesses the network of the other authentication proxy server, no mechanism is specified to continue to provide the receiver with program access entitlement information corresponding to the network of the previously accessed authentication proxy server from the network of the newly accessed authentication proxy server. In this case, even though the user moves to the authentication proxy server network of the same cable service provider, the user may not view the program.

Also, although a corresponding receiver no longer exists in the network of the previous authentication proxy server, program access entitlement information is continuously transmitted to the previous network. Accordingly, communication resources may be wasted and the usage efficiency of the network may be deteriorated.

Accordingly, there is a need for technology that can more effectively support the mobility of a DCAS host.

SUMMARY OF THE INVENTION

An aspect of the present invention provides a DCAS provisioning server (DPS) and method for supporting a mobility of a DCAS host that can instruct a conditional access system (CAS) server to transmit an entitlement management message to a network of a second authentication proxy server and thereby enables a user to seamlessly receive a service, when mutual authentication between a secure micro of a DCAS host and the second authentication proxy server is completed.

Another aspect of the present invention also provides a DPS and method for supporting a mobility of a DCAS host that can instruct a CAS server to not transmit an entitlement management message to a network of a first authentication proxy server and thereby can reduce resource waste and improve the usage efficiency of the network, when mutual authentication between a secure micro of a DCAS host and a second authentication proxy server is completed.

According to an aspect of the present invention, there is provided a DPS for supporting a mobility of a DCAS host, the DPS including: a mapping information receiver to receive, from a second authentication proxy server, mapping information between the second authentication proxy server and a secure micro of the DCAS host; and an instruction unit to, in response to receiving the mapping information, instruct a conditional access system (CAS) server to transmit an entitlement management message to a network of the second authentication proxy server without transmitting the entitlement management message to a network of a first authentication proxy server.

According to another aspect of the present invention, there is provided a method of supporting a mobility of a DCAS host, the method including: by a second authentication proxy server: performing mutual authentication with a secure micro of the DCAS host to generate a session key; requesting an integrated personalization system to download a secure micro client to the DCAS host, wherein the secure micro client is encoded using the session key; and transmitting, to a DPS, mapping information between the second authentication proxy server and the secure micro of the DCAS host, wherein, in response to receiving the mapping information, the DPS instructs a CAS server to transmit an entitlement management message to a network of the second authentication proxy server without transmitting the entitlement management message to a network of a first authentication proxy server.

According to still another aspect of the present invention, there is provided in a conditional access system for supporting a mobility of a DCAS host, the system including: a second authentication proxy server to perform mutual authentication with a secure micro of the DCAS host for generating a session key, to request an integrated personalization system to download a secure micro client encoded using the session key to the DCAS host, and to transmit, to a DPS, mapping information between a second authentication proxy server and the secure micro of the DCAS host; and the integrated personalization system to perform a process for downloading the secure micro client encoded using the session key to the DCAS host according to the request of the second authentication proxy server, wherein the DPS, in response to receiving the mapping information, instructs a CAS server to transmit an entitlement management message to a network of the second authentication proxy server without transmitting the entitlement management message to a network of a first authentication proxy server.

According to yet another aspect of the present invention, there is provided a method of operating a DPS, the method including: by a DPS: receiving, from a second authentication proxy server, mapping information between the second authentication proxy server and a secure micro of a DCAS host; and in response to receiving the mapping information, instructing a CAS server to transmit an entitlement management message to the network of the second authentication proxy server without transmitting the entitlement management message to the network of the first authentication proxy server.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

Figure 1:
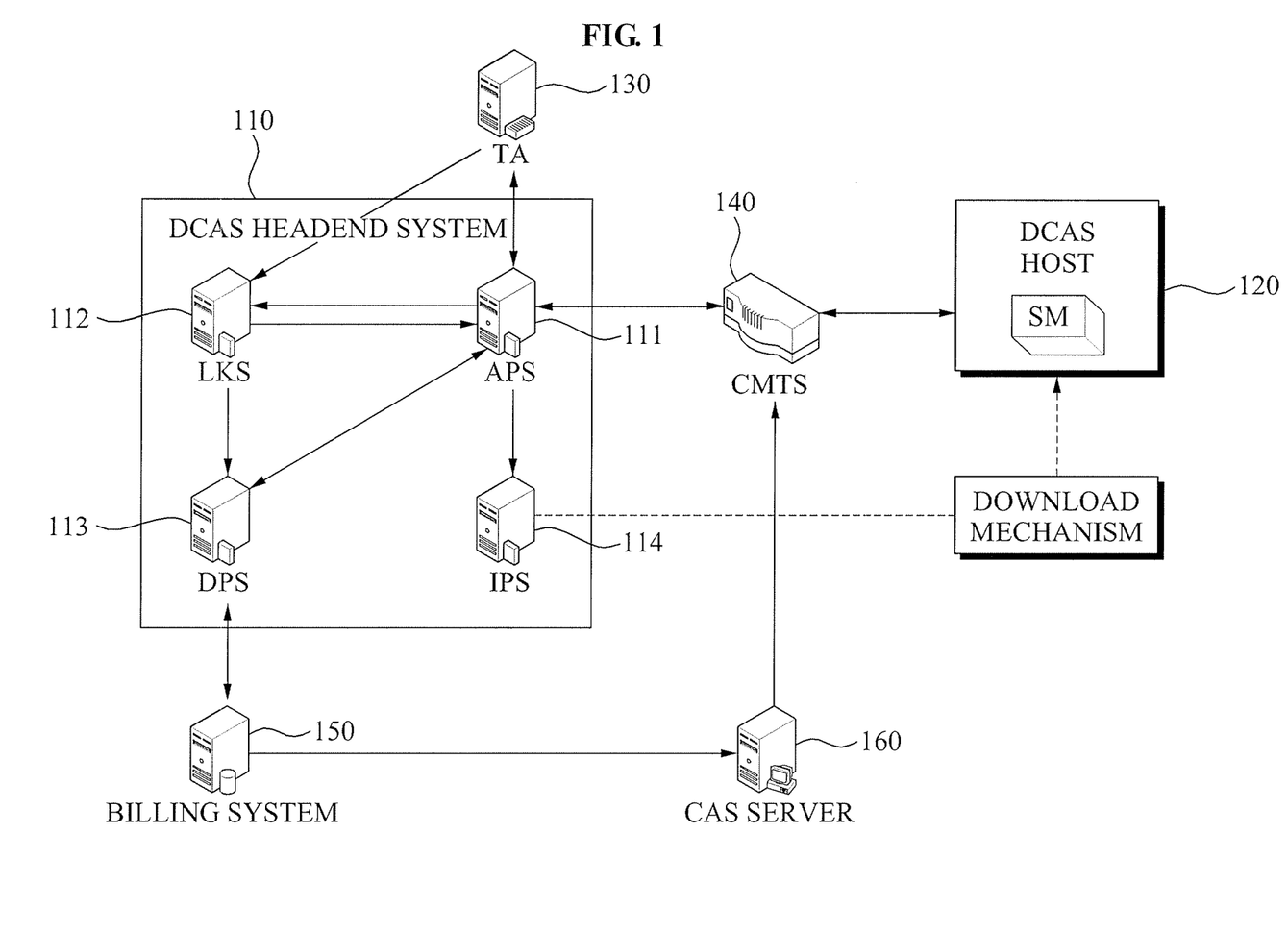
FIG. 1 illustrates a Downloadable Conditional Access System (DCAS) according to an embodiment of the present invention.

FIG. 1 illustrates a Downloadable Conditional Access System (DCAS) according to an embodiment of the present invention.

Referring to FIG. 1, the DCAS includes a DCAS headend system 110, a DCAS host 120, a trusted authority (TA) device 130, a Cable Modem Termination System (CMTS) 140, a billing system 150, and a CAS server 160.

The DCAS headend system 110 may perform authentication for the DCAS host 120 and transmit a secure micro (SM) client to be installed in an SM of the DCAS host 120. The DCAS headend system 110 may include an authentication proxy server (APS) 111, a local key server (LKS) 112, a DCAS provisioning server (DPS) 113, and an integrated personalization system (IPS) 114.

When the DCAS host 120 initially accesses a network to thereby need installing of a new SM client or updating of the SM client, the DCAS host 120 and the APS 111 may perform mutual authentication. The APS 111 may request the TA 130 for the authentication of the DCAS host 120. The TA 130 is a trusted external authority.

When mutual authentication between the DCAS host 120 and the APS 111 is completed, the APS 111 may generate a session key and share the session key with the DCAS host 120. The session key may be used to encode and decode a DCAS message and the SM client.

The APS 111 may receive information associated with a download mechanism from the DPS 113. The APS 111 may instruct the IPS 114 to perform a process for downloading the SM client based on the received information. The IPS 114 may perform the process for downloading, to the DCAS host 120, the SM client that is encoded using the session key according to the download mechanism that is determined by the DPS 113.

The DCAS host 120 may install the downloaded SM client. The billing system 150 may maintain and manage subscription information associated with subscribers of a broadcast program and provide the subscription information to the CAS server 160. The CAS server 160 may transmit an entitlement management message (EMM) corresponding to the DCAS host 120 to the DCAS host 120 based on the subscription information. The DCAS host 120 may decode the encoded program using the EMM.

The LKS 112 may store and manage a security-related key and identification (ID) information that is operated in a DCAS network and may have a restoring function in the case of a disaster.

Figure 2:
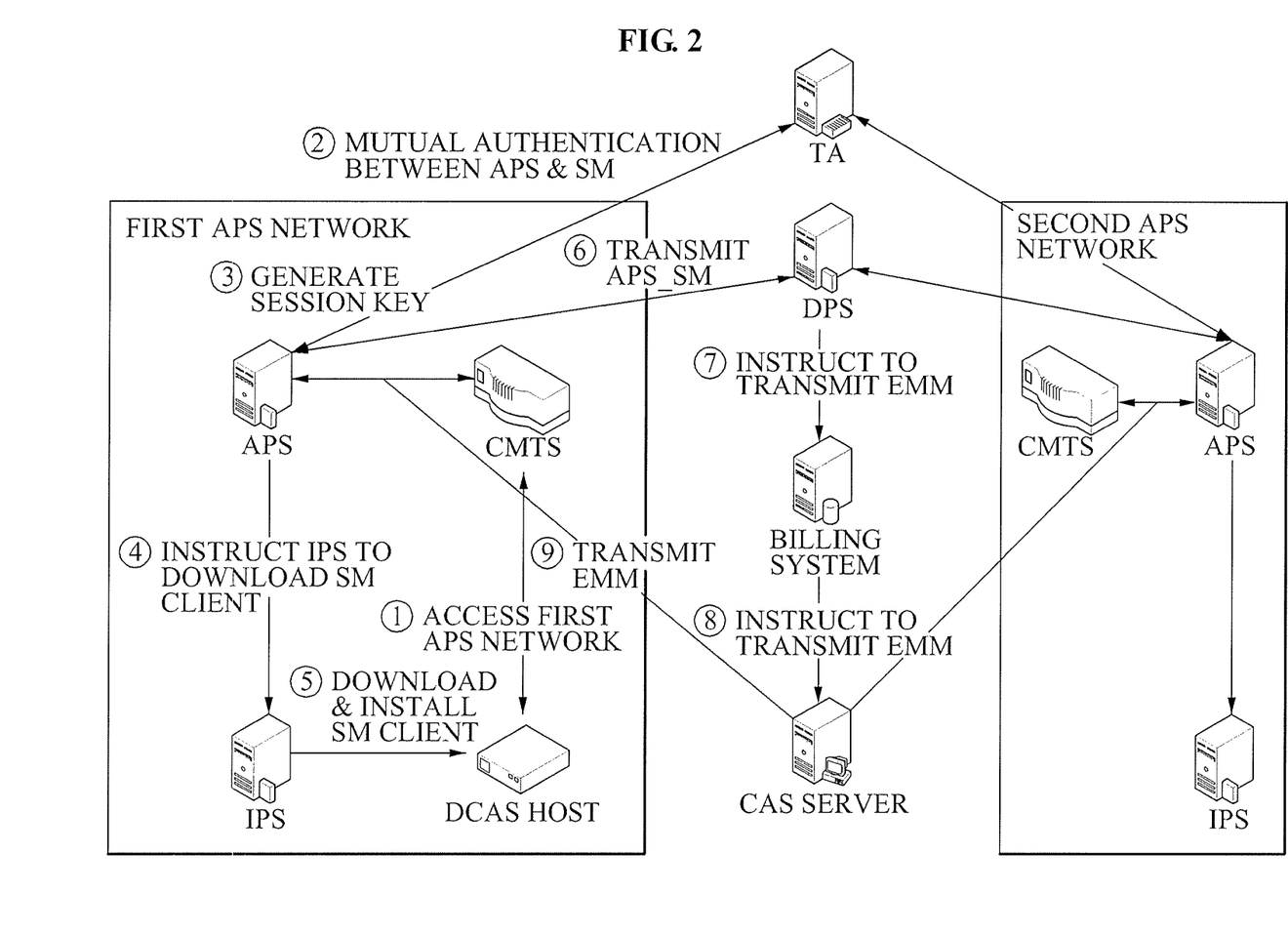
FIG. 2 illustrates an example of a DCAS host accessing a network of a first authentication proxy server according to an embodiment of the present invention.

FIG. 2 illustrates an example of a DCAS host accessing a network of a first APS according to an embodiment of the present invention.

Referring to FIG. 2, when the DCAS host accesses a first APS network in operation ①, an APS and an SM of the DCAS host may perform mutual authentication via a TA in operation ②.

When mutual authentication between the APS and the SM of the DCAS host is completed in operation ②, the APS may generate a session key in operation ③ and instruct an IPS to download an SM client to the DCAS host in operation ④. The IPS may download the SM client encoded using the session key to the DCAS host and install the downloaded SM client in operation ⑤.

The APS may transmit, to a DPS, mapping information (APS_SM) between an ID of the APS (APS_ID) and an ID of the SM (SM_ID) in operation ⑥. The DPS may transfer the mapping information (APS_SM) to a billing system and instruct the billing system to transmit an EMM to the first APS network in operation ⑦.

The billing system may include a subscriber management system (SMS). The billing system may instruct a CAS server to transmit an EMM corresponding to the DCAS host to the network of the APS based on the ID of the APS (APS_ID) and the ID of the SM (SM_ID) that are included in the mapping information (APS_SM) in operation ⑧.

The CAS server may include a Subscriber Authorization System (SAS). In response to the instruction from the DPS and the billing system, the CAS server may transmit the EMM corresponding to the DCAS host to the network of the APS in operation ⑨.

Figure 3:
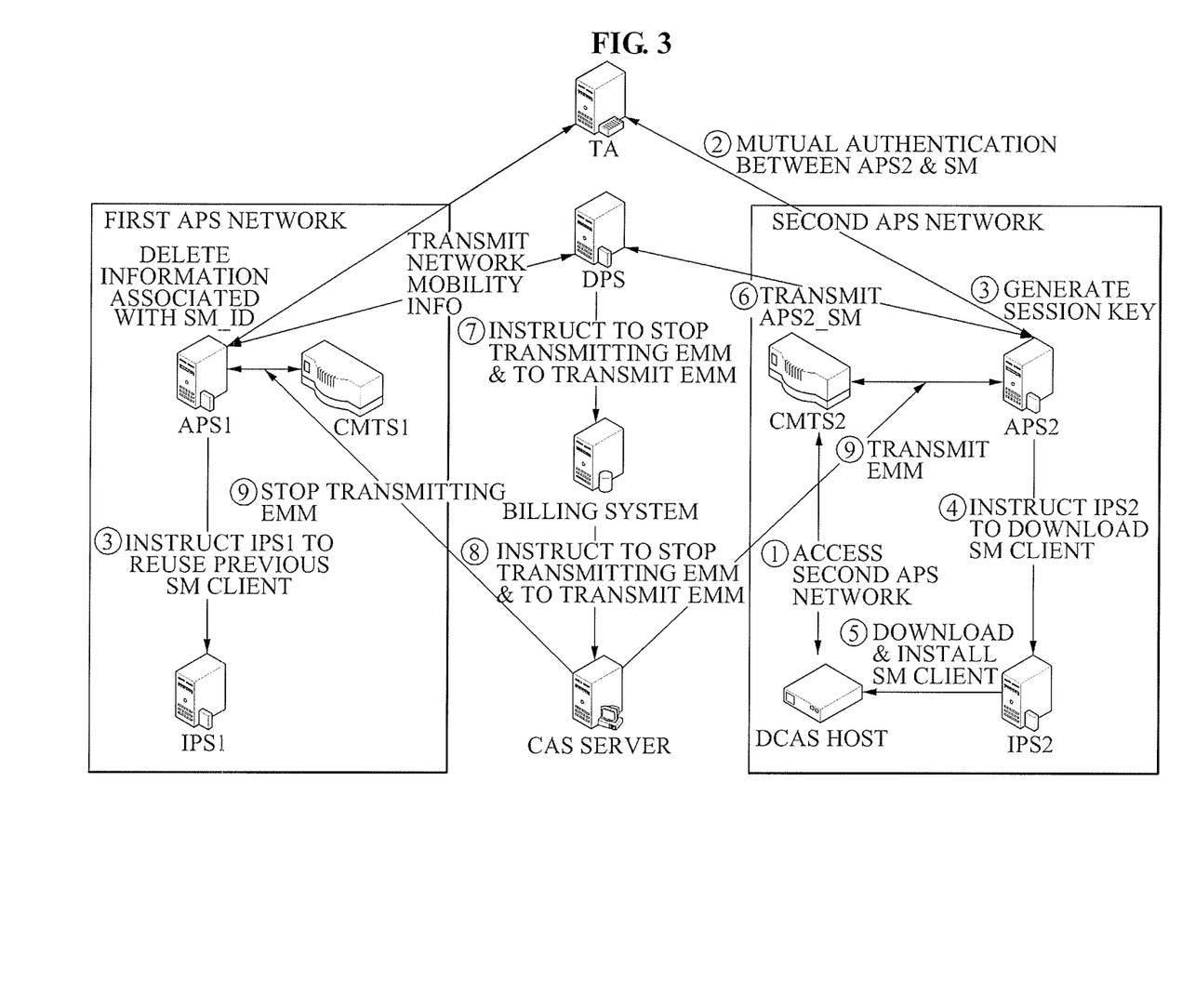
FIG. 3 illustrates an example of a DCAS host moving from a network of a first authentication proxy server to a network of a second authentication proxy server to access the network of the second authentication proxy server according to an embodiment of the present invention.

FIG. 3 illustrates an example of a DCAS host moving from a network of a first APS to a network of a second APS to access the network of the second APS according to an embodiment of the present invention.

Referring to FIG. 3, the DCAS host moves from a first APS network to a second APS network. When the DCAS host moves to the second APS network to thereby access the second APS network in operation ①, the DCAS host may determine whether to reinstall or additionally install an SM client. Generally, when the DCAS host moves from the first APS network to the second APS network, the SM client may be reinstalled in the DCAS host.

When the DCAS host accesses the second APS network, mutual authentication between the second APS (APS2) and the SM may be performed via a TA in operation ②. When mutual authentication between the APS2 and the SM is completed in operation ②, the APS2 may generate a session key for encoding and decoding the SM client and a DCAS message in operation ③.

The APS2 may instruct a second IPS (IPS2) to download the SM client to the DCAS host in operation ④. In response to the instruction from the APS2, the IPS2 may download the SM client to the DCAS host and install the downloaded SM client in operation ⑤. The DCAS host may delete the SM client that is previously installed when accessing the first APS network, and then install the newly downloaded SM client.

The APS2 may transmit, to the DPS, mapping information (APS2_SM) between the APS2 and the SM of the DCAS host in operation ⑥.

The DPS may transmit network mobility information to the first APS (APS1). In response to receiving the network mobility information, the APS1 may delete information associated the ID of the SM (SM_ID) of the DCAS host. The APS1 may instruct the IPS1 to perform a process for reusing the previously used SM client of the DCAS host. Accordingly, even though another DCAS host accesses the first APS network, the previous SM client may be used for the other DCAS host.

The DPS may retrieve stored mapping information (APS1_SM) using the ID of the SM (SM_ID), reflect the ID of the APS2 (APS2_ID), and update the mapping information (APS1_SM) with the mapping information (APS2_SM).

The DPS may transmit the mapping information (APS1_SM) and the mapping information (APS2_SM) to the billing system. Since the billing system may be aware of the mapping information (APS1_SM) in advance, the DPS may transmit only the mapping information (APS2_SM) to the billing system.

The DPS may instruct the billing system to transmit the EMM to the second APS network without transmitting the EMM to the first APS network in operation ⑦.

The billing system may instruct the CAS server to transmit the EMM to the second APS network without transmitting the EMM to the first APS network, based on the ID of the APS1 (APS1_ID), the ID of the APS2 (APS2_ID), and the ID of the SM (SM_ID) in operation ⑧.

In response to the instruction from the DPS and the billing system, the CAS server may transmit the EMM to the second APS network without transmitting the EMM to the first APS network in operation ⑨.

According to an aspect of the present invention, since an EMM is not transmitted to a first APS network, it is possible to save communication resources and improve the usage efficiency of the first APS network.

Also, according to an aspect of the present invention, since an EMM is transmitted to a second APS network, a user may seamlessly receive a broadcasting service.

Figure 4:
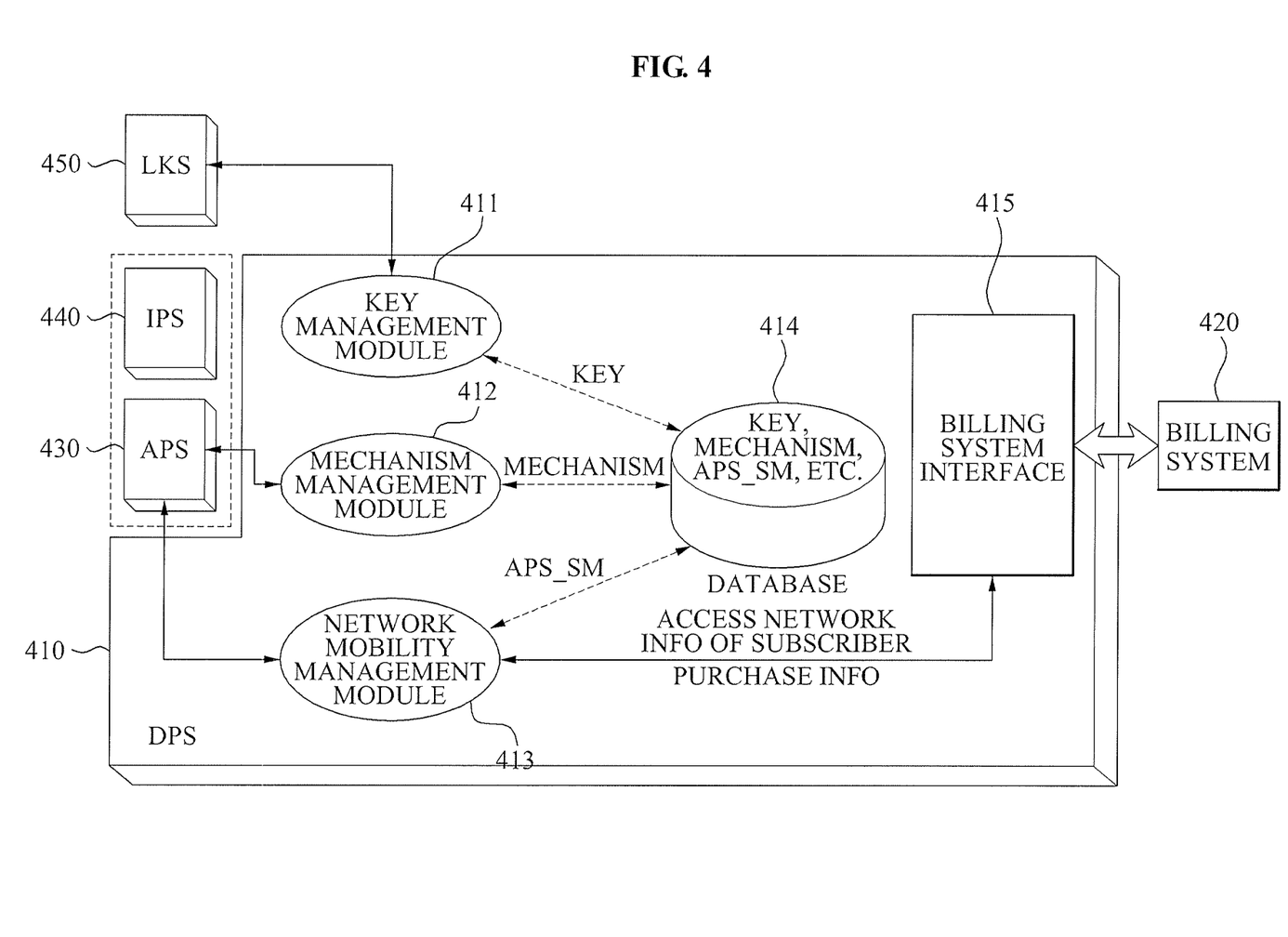
FIG. 4 illustrates a DPS according to an embodiment of the present invention.

FIG. 4 illustrates a DPS 410 according to an embodiment of the present invention.

Referring to FIG. 4, the DPS 410 includes a plurality of functions modules such as a key management module 411, a mechanism management module 412, and a network mobility management module 413.

The DPS 410 functions as a central manager to determine and maintain a DCAS mechanism of a cable service provider in a DCAS service structure. The DPS 410 may transmit and receive a message for functional operation to and from an APS 430 or an LKS 440. The DPS 410 may communicate with a billing system 420 via a billing system interface 415.

When recovering from a disaster, the key management module 411 functions to back up key information from the LKS 450.

The mechanism management module 412 functions to maintain and manage information for DCAS mechanism of a cable service provider in a database 414. Also, the mechanism management module 412 may enable the APS 430 to reflect the changed DCAS mechanism through management regarding generation, deletion, or change of DCAS mechanism information. The mechanism management module 412 may determine via which IPS 440 the DCAS host downloads an SM client.

The network mobility management module 413 may detect the network mobility of the APS 430 and transfer a detected result to a CAS server that is connected with the billing system 420. Therefore, it is possible to support a mobility of a DCAS host so that even though a subscriber moves, the subscriber may maintain a qualification for viewing a corresponding broadcast program.

Although not shown in FIG. 4, the network mobility management module 413 may include a mapping information receiver and an instruction unit. The mapping information receiver may receive, from the APS 430, mapping information between the APS 430 and the SM. In response to receiving the mapping information, the instruction unit may instruct the CAS server to transmit an EMM to the APS 430 and stop transmitting the EMM to a previous APS.

Figure 5:
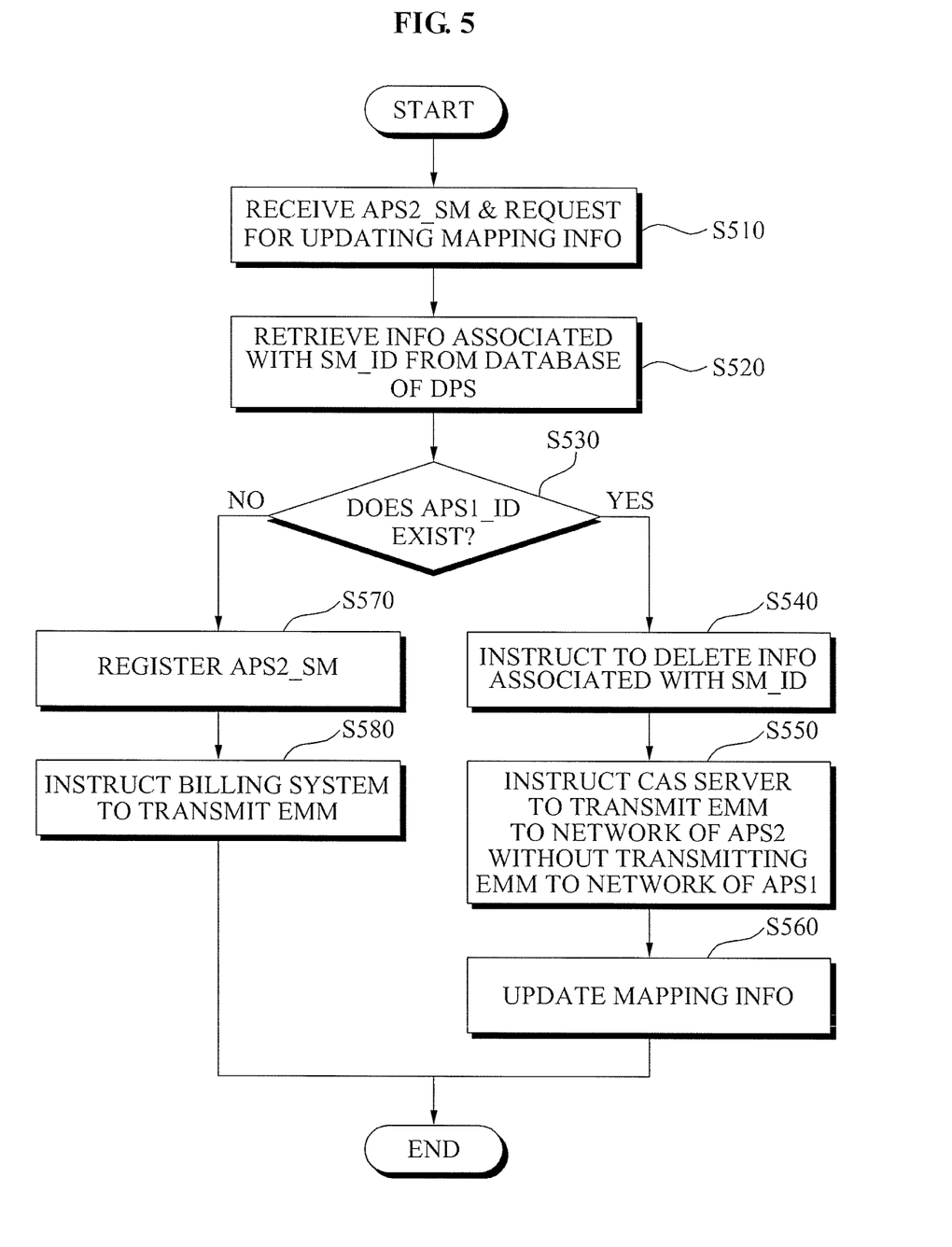
FIG. 5 is a flowchart illustrating a method of operating a DPS that supports a mobility of a DCAS host according to an embodiment of the present invention.

FIG. 5 is a flowchart illustrating a method of operating a DPS that supports a mobility of a DCAS host according to an embodiment of the present invention. Hereinafter, it is assumed that the DCAS host moves from a network of a first APS (APS1) to a network of a second APS (APS2).

Referring to FIG. 5, in operation S510, the method may receive mapping information (APS2_SM) and a request for updating of mapping information from the APS2. The mapping information (APS2_SM) may include an ID of an SM (SM_ID) and an ID of the APS2 (APS2_ID).

In operation S520, the method may retrieve an ID of the APS1 (APS1_ID) that maps the ID of the SM (SM_ID) from a database of a DPS.

In operation S530, the method may determine whether the database of the DPS includes the ID of the APS1 (APS1_ID).

When the database of the DPS does not include the ID of the APS1 (APS1_ID) in operation S530, it may be translated that the DCAS host initially accessed a network of a cable provider.

In operation S570, the method may register the mapping information (APS2_SM) between the ID of the APS2 (APS2_ID) and the ID of the SM (SM_ID). In operation S580, the DPS may instruct a billing system to transmit an EMM corresponding to the ID of the SM (SM_ID) to the DCAS host via the CAS server.

Conversely, when the database of the DPS includes the ID of the AP1 (AP1_ID) in operation S530, it may be translated that the DCAS host moved from the network of the APS1 to the network of the APS2.

In operation S540, the method may instruct to delete information associated with the ID of the SM (SM_ID) that is stored in the network of the APS1.

In operation S550, the method may instruct the CAS server to transmit the EMM to the network of the APS2 without transmitting the EMM to the network of the APS1.

In operation S560, the method may update the mapping information (APS1_SM) of the DPS with the mapping information (APS2_SM).

According to the present invention, there may be provided a DPS and method for supporting a mobility of a DCAS host that can instruct a conditional access system (CAS) server to transmit an entitlement management message to a network of a second authentication proxy server and thereby enables a user to seamlessly receive a service, when mutual authentication between a secure micro of a DCAS host and the second authentication proxy server is completed.

Also, according to the present invention, there may be provided a DPS and method for supporting a mobility of a DCAS host that can instruct a CAS server to not transmit an entitlement management message to a network of a first authentication proxy server and thereby can reduce resource waste and improve the usage efficiency of the network, when mutual authentication between a secure micro of a DCAS host and a second authentication proxy server is completed.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A Downloadable Conditional Access System (DCAS) provisioning server (DPS) in a network supporting a host that moves from a network of a first authentication proxy server to a network of a second authentication proxy server, the DPS comprising:
   a mapping information receiver to receive, from the second authentication proxy server, mapping information between the second authentication proxy server and a secure micro of the host,
   wherein the secure micro is used for the host as the host moves from the network of the first authentication proxy server to the network of the second authentication proxy server; and
   an instruction unit to, in response to receiving the mapping information, instruct a conditional access system (CAS) server to transmit an entitlement management message to the network of the second authentication proxy server without transmitting the entitlement management message to the network of the first authentication proxy server, and
   wherein the entitlement management message is configured to support the host while the host is in either the network of the first authentication proxy server or the network of the second authentication proxy server.

2. The DPS of claim 1, wherein the mapping information is generated when mutual authentication between the second authentication proxy server and the secure micro of the host is completed.

3. The DPS of claim 1, wherein a secure micro client corresponding to the network of the second authentication proxy server is downloaded and installed in the secure micro of the host.

4. The DPS of claim 1, wherein the second authentication proxy server and the secure micro of the host perform mutual authentication via a trusted authority to generate a session key for encoding/decoding a secure micro client and then generate the mapping information.

5. The DPS of claim 1, wherein the instruction unit instructs the first authentication proxy server to delete information associated with the secure micro of the host, and
   the first authentication proxy server instructs to reuse a previous secure micro client installed in the host.

6. The DPS of claim 1, wherein the CAS server receives the instruction from the instruction unit via a billing system that includes a subscriber management system, and
   the CAS server transmits, in response to the instruction from the instruction unit, an entitlement management message to the network of the second authentication proxy server without transmitting the entitlement management message to the network of the first authentication proxy server.

7. A method of supporting a mobility of a host in a network supporting a host that moves from a network of a first authentication proxy server to a network of a second authentication proxy server, the method comprising:
   by the second authentication proxy server:
   performing mutual authentication with a secure micro of the host to generate a session key;
   requesting an integrated personalization system to download a secure micro client to the host, wherein the secure micro client is encoded using the session key; and
   transmitting, to a DPS, mapping information between the second authentication proxy server and the secure micro of the host,
   wherein the secure micro operates for the host as the host moves from the network of the first authentication proxy server to the network of the second authentication proxy server,
   wherein, in response to receiving the mapping information, the DPS instructs a CAS server to transmit an entitlement management message to the network of the second authentication proxy server without transmitting the entitlement management message to the network of the first authentication proxy server, and
   wherein the entitlement management message is configured to support the host while the host is in either the network of the first authentication proxy server or the network of the second authentication proxy server.

8. The method of claim 7, wherein, in the generating of the session key, the second authentication proxy server and the secure micro of the host perform mutual authentication via a trusted authority to generate the session key.

9. The method of claim 7, wherein the DPS instructs the first authentication proxy server to delete information associated with the secure micro of the host, and
   the first authentication proxy server instructs an integrated personalization system belonging to the network of the first authentication proxy server to reuse a previous secure micro client installed in the host.

10. A conditional access system in a network supporting a host that moves from a network of a first authentication proxy server to a network of a second authentication proxy server, the conditional access system comprising:
    the second authentication proxy server to perform mutual authentication with a secure micro of the host for generating a session key, to request an integrated personalization system to download a secure micro client encoded using the session key to the host, and to transmit, to a DPS, mapping information between the second authentication proxy server and the secure micro of the host, wherein the secure micro operates for the host as the host moves from the network of the first authentication proxy server to the network of the second authentication proxy server; and the integrated personalization system to perform a process for downloading the secure micro client encoded using the session key to the host according to the request of the second authentication proxy server, wherein the DPS, in response to receiving the mapping information, instructs a CAS server to transmit an entitlement management message to the network of the second authentication proxy server without transmitting the entitlement management message to the network of the first authentication proxy server, and wherein the entitlement management message is configured to support the host while the host is in either the network of the first authentication proxy server or the network of the second authentication proxy server.

11. The conditional access system of claim 10, wherein the DPS instructs the first authentication proxy server to delete information associated with the secure micro of the host, and the first authentication server instructs to reuse a previous secure micro client installed in the host.

12. A method of operating a DPS in a network supporting a DCAS host that moves from a network of a first authentication proxy server to a network of a second authentication proxy server, the method comprising:

by a DPS:

receiving, from the second authentication proxy server, mapping information between the second authentication proxy server and a secure micro of the host, wherein the secure micro operates for the host as the host moves from the network of the first authentication proxy server to the network of the second authentication proxy server; and in response to receiving the mapping information, instructing a CAS server to transmit an entitlement management message to the network of the second authentication proxy server without transmitting the entitlement management message to the network of the first authentication proxy server, and wherein the entitlement management message is configured to support the host while the host is in either the network of the first authentication proxy server or the network of the second authentication proxy server.

13. The method of claim 12, wherein, in the instructing, the DPS instructs the first authentication proxy server to delete information associated with the secure micro of the host, and the first authentication proxy server instructs to reuse a previous secure micro client installed in the host.

* * * * *